United States Patent Office 3,137,208
Patented June 16, 1964

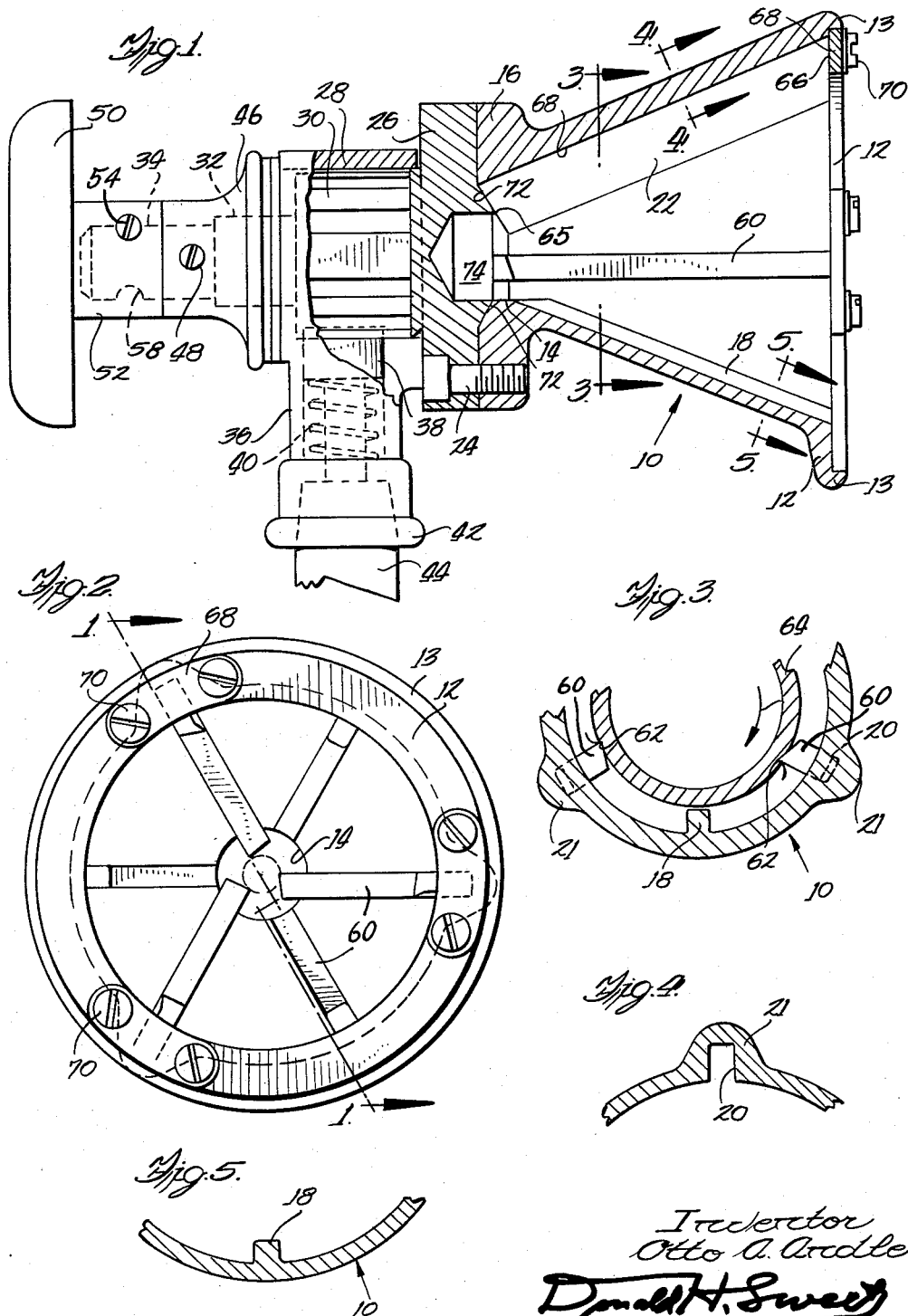

3,137,208
CHAMFERING TOOL
Otto A. Andler, 4130 N. Troy, Chicago 18, Ill.
Filed Dec. 5, 1962, Ser. No. 242,394
11 Claims. (Cl. 90—12)

My invention relates to tools for machining pipe ends on the job and includes among its objects and advantages improved equipment for putting external pipe threads on the ends of cut pieces of pipe, and chamfering the ends after the threads are cut.

The threading may be conventional and there are effective tools for it, but chamfering is so nearly an unsolved problem that many faulty assemblies result. The only expedient readily available on the job is just a hand file, and a conscientious worker can lay the pipe on a horse or other suitable support and remove the burrs by filing a bevel chamfer by hand while turning the pipe slowly by hand. This is crude, but it can be effective with the exercise of considerable care. If a foreman does not happen to be standing watching the men do the work, it is likely to be forgotten or deliberately omitted, and the pipes are screwed together without bothering to remove the burrs. When about one in every ten joints assemblied in this way is leaky because a metal chip is lodged between the threads, the labor needed to ferret out the leaks and take the joints apart and to clean and reassemble them may well be more than that consumed in making the original assembly.

Accordingly, my invention is primarily equipment for doing this particular bit of machining quickly and dependably with a minimum of additional equipment.

Other objects of the invention will become apparent as the description proceeds.

In the accompanying drawings:

FIGURE 1 is a side elevation partly in section of equipment according to the invention;

FIGURE 2 is an end view of same;

FIGURE 3 is a fragmentary diagram of the cutting action, as on line 3—3 of FIGURE 1;

FIGURE 4 is a detail section on line 4—4 of FIGURE 1;

FIGURE 5 is a detail section on line 5—5 of FIGURE 1.

In the embodiment of the invention selected for illustration, the main tool body 10 is a one piece investment casting of malleable metal. It has the general shape of a truncated hollow, right circular cone, the geometrical generatrix of which lies at an angle of 20°30' to the axis. At its large end, it has a peripheral flange 12 and an outer lip 13. At its small end, it has a short cylindrical neck 14 surrounded by a heavy mounting flange 16.

The tapered main portion of the body 10 has three equally spaced guides, or steady rest ribs 18 extending from end to end. Midway between each pair of ribs 18, the body has grooves 20 adapted to receive cutting tools 22. It will be noted that there is a steady rest rib 18 diametrically opposite each cutting tool. An outwardly projecting rib 21 is provided in register with each slot 20 to provide full strength in the body.

The mounting flange 16 is suitably bolted, as by machine bolts 24, to the abutment plate 26 of a stem having a ratchet portion 30, a first cylindrical guide portion 32, and a second cylindrical guide portion 34 of smaller diameter.

Means are provided for rotating the tool about its axis and simultaneously exerting axial thrust.

The rotating means is a ring 28 encircling the ratchet 30. The ring has a radial arm 36 housing a pawl 38 pressed radially inward by a compression spring 40. The arm 36 is continued radially in an outwardly opening socket 42 adapted to receive the end of a torque lever 44. The ring 28 has sliding engagement with the adjacent face of the plate 26. A stationary retainer 46 is anchored by a set screw 48 and has sliding contact with the other end of the ring 28.

The means for exerting axial thrust is a conventional head 50 having a tubular shank 52 swiveled on the cylindrical guide portion 34, as by an off-center pin 54 slidable in a peripheral groove 56 in the guide groove 58.

In each of the grooves 20, I provide a cutting tooth 60 having a cutting edge at 62. As best indicated in FIGURE 3, the geometrical cone of which the bearing faces of the ribs 18 are elements, has the same taper as the geometrical cone of which the cutting edges 62 are elements, but the cone defined by the ribs is of slightly greater diameter in any transverse plane than the cone defined by the cutting edges. Therefore, axial thrust sufficient to engage the ribs 18 firmly with a workpiece 64 will force the cutting edges 62 in to take a cut of depth determined by the difference between the diameters of the two cones.

It will be apparent that rotation of the tool in the position indicated in FIGURES 2 and 3 will remove material from the workpiece 64 until the end of it has been chamfered to define a narrow conical surface of the same taper as the taper of the tool itself.

The body 10 is continuous past the ribs 18 and the grooves 20 and forms an abutment surface such that a workpiece 64 small enough in diameter to pass between a rib 18 and a tooth 60, will encounter the concave conical surface of the body and thus be guided into coaxial relationship with the tool, or, if the workpiece is fixed, the contact will guide the tool assembly into axial registration with the workpiece.

Each tooth 60 has a flat end face, and the end face at the small end, indicated at 64 in FIGURE 1, together with the end face 66 at the large end, are in planes inclined toward each other; and both planes make acute dihedral angles with the plane of the outer face at 68 bearing on the bottom of the groove. To fasten the teeth firmly in place, I provide, for each tooth, a small plate 68, which extends across over the end of the tooth and is drawn axially against the flange 12, as by fastening screws 70. This clamps the tooth firmly in place in assembled position and no other fastening is necessary. The heavy loads incident to cutting are received by the bottom and sidewalls of the groove 20.

Most of the chips will find their way out readily in the annular space between the workpiece and the body 10, especially when the tool has its axis horizontal, which will usually be the case. I provide the face plate 26 with a convex conical portion 72 shaped to abut the inner end faces 65 of the teeth. I also provide a small axial chamber at 74 to provide ample clearance for accumulating chips when the workpiece being chamfered is only slightly larger than the minimum diameter that can be machined by a tool assembly of this size.

It is noted that the die casting 10 requires a minimum of machining, and no adjustment by the user is called for. Teeth such as those illustrated can be produced with high precision at the place of manufacture. They have a long life and when they are materially worn, they can be removed and replaced with a new set. However, for emergencies, it will be obvious that a shim about 0.002" thick laid in the bottom of each groove 20 will advance each tooth to take a full cut. A strip of ordinary bond paper can be cut with scissors and laid in below the tooth, and effective use is restored.

Others may readily adapt the invention for use under various conditions of service by employing one or more of the novel features disclosed or equivalents thereof. As at present advised, with respect to the apparent scope of my invention, I desire to claim the following subject matter:

1. A chamfering tool comprising, in combination: a body having three converging, equally spaced ribs, having inner faces defining elements of a first truncated right circular cone; said body also providing three, equally spaced grooves, each groove being substantially diametrically opposite one of said ribs; three cutting tools in said grooves; said tools having cutting edges facing tangentially and inwardly; said cutting edges defining elements of a second truncated right circular cone; said first and second cones being coaxial and having the same taper; said second cone, in any cross section normal to the axis of said cones, being of smaller diameter than said first cone; the difference between said diameters being equal to the desired depth of cut for said tools.

2. A tool according to claim 1 in which said body has portions bridging the tapered spaces between said grooves and sides, and adapted to engage the end of a workpiece and guide the tool and workpiece into coaxial working position.

3. A tool according to claim 2 in which said bridging portions define a complete hollow cone, adapted, when the cone axis is horizontal, to guide chips from said workpiece to the large end of said body and release them there.

4. A combination according to claim 3, in which said grooves have plane parallel sides and a bottom joining the sides; the tooth in said groove fitting snugly against said sides and bottom, and being slidable longitudinally in said groove.

5. A combination according to claim 4, in which the cutting edge of each tooth is parallel to the bottom of the groove receiving said tooth.

6. A combination according to claim 5, in which each groove bottom and the engaging bottom face of the tooth in said groove are plane, and adapted to be firmly held separated by an inserted shim, to increase the depth of cut of the tooth.

7. A tool according to claim 6 in combination with fixed tooth abutment fastening means at the small end of said cones; and detachable abutment fastening means at the large end of said body; each tooth presenting a plane abutment end face to each of said fastening means.

8. A combination according to claim 7, in which each tooth end face intersects the bottom face of the tooth at an acute dihedral angle.

9. A combination according to claim 8, in which the outer ends of said teeth all lie in a common plane normal to the cone axis.

10. A hand tool for chamfering the cut edges of the ends of workpieces having the general external shape of a right cylinder truncated in a plane normal to the cylinder axis, comprising, in combination: a tool according to claim 1; said tool having an integral coaxial extension beyond the small end of said cones; a torque lever rotatably mounted on said extension for rotation about the cone axis; a driving connection between said torque lever and said extension; and a hand pressure head swiveled on the end of said extension.

11. A combination according to claim 10, in which said driving connection is adapted to transmit torque in one direction only; whereby said torque lever can cause step by step rotation, all in one direction, by rotary reciprocation of said lever to and fro.

References Cited in the file of this patent
UNITED STATES PATENTS

| | | |
|---|---|---|
| 651,377 | McDermott | June 12, 1900 |
| 1,410,071 | Mueller | Mar. 21, 1922 |
| 1,791,649 | Vosper | Feb. 10, 1931 |
| 1,884,460 | Williams | Oct. 25, 1932 |
| 2,292,581 | Richardson | Aug. 11, 1942 |
| 2,688,902 | Andler | Sept. 14, 1954 |

FOREIGN PATENTS

| | | |
|---|---|---|
| 1,884,460 | Germany | Oct. 25, 1932 |